United States Patent [19]
Futawatari

[11] Patent Number: 5,677,840
[45] Date of Patent: Oct. 14, 1997

[54] SLIP CONTROL SYSTEM FOR AUTOMOTIVE VEHICLE WITH MEANS FOR CONTROLLING THE LOCK-UP STATE OF A TORQUE CONVERTER

[75] Inventor: Toru Futawatari, Fuji, Japan

[73] Assignee: Jatco Corporation, Fuji, Japan

[21] Appl. No.: 475,686

[22] Filed: Jun. 7, 1995

[30] Foreign Application Priority Data

Jul. 13, 1994 [JP] Japan ................... 6-161363

[51] Int. Cl.⁶ .................... B60K 41/10; F16H 61/14
[52] U.S. Cl. .................... 364/426.033; 180/197; 364/426.027
[58] Field of Search ............ 364/426.03, 426.01, 364/426.027, 426.033, 424.091, 424.094; 180/197; 303/139, 145, 164; 192/3.31, 3.28; 477/176, 77

[56] References Cited

U.S. PATENT DOCUMENTS

| | | | |
|---|---|---|---|
| 4,676,353 | 6/1987 | Matsuda | 192/13 R |
| 4,691,812 | 9/1987 | Takizawa | 192/3.3 |
| 4,730,709 | 3/1988 | Kawata et al. | 192/3.31 |
| 5,092,435 | 3/1992 | Sone et al. | 192/0.032 |
| 5,283,742 | 2/1994 | Wazaki et al. | 364/426.02 |
| 5,569,117 | 10/1996 | Kono et al. | 477/169 |

*Primary Examiner*—Michael Zanelli
*Attorney, Agent, or Firm*—Foley & Lardner

[57] ABSTRACT

A slip control system for an automotive vehicle includes an automatic power transmission, a torque converter, a lock-up control device for controlling operation of the lock-up device depending upon an input from a traveling state detection device which detects traveling condition including driving operation, an acceleration slip detection device provided as a part of the traveling state detection device for detecting acceleration slip of the driving wheels, a torque reduction device for reducing a torque to be delivered to the drive wheels, an acceleration slip control device for operating the torque reduction device for performing acceleration slip suppressing control when the acceleration slip detecting device detects acceleration slip, and a holding device for inhibiting switching of operational state of the lock-up device by the lock-up control device while the acceleration slip control device is in operative state for performing acceleration slip suppressing control, to maintain the torque converter in the state immediately before initiation of the acceleration slip suppressing control.

11 Claims, 6 Drawing Sheets

SLIP CONTROL SYSTEM FOR AUTOMOTIVE VEHICLE WITH MEANS FOR CONTROLLING THE LOCK-UP STATE OF A TORQUE CONVERTER

BACKGROUND OF THE INVENTION

1. Field of the Invention

The present invention relates to a slip control system for an automotive vehicle. More specifically, the invention relates to a system for suppressing acceleration slip of the automotive vehicle.

2. Description of Related Art

As a conventional slip control system for an automotive vehicle for suppressing acceleration slip, there has been known a system disclosed in Japanese Patent Application Laid-open No. 176264/1990.

The conventional automotive slip control system disclosed in the above-identified publication, comprises an engine output restriction means for restricting an output of an internal combustion engine when an acceleration slip on vehicular driving wheels is detected by an acceleration slip detecting means and a lock-up inhibiting means for inhibiting direct coupling of an input shaft (an engine output shaft) and an output shaft (an automatic transmission input shaft) of a torque converter while the engine output restriction means is active. Therefore, when the output of the internal combustion engine is restricted by the operation of the engine output restriction means, substantial torque variation is caused. However, since lock-up is inhibited at this time, the torque variation can be absorbed by the torque converter for stabilizing the vehicle.

However, in the above-mentioned conventional automotive slip control system, the following drawbacks may be caused.

Namely, when a torque converter is in a lock-up state immediately before lowering of the output torque of the engine by the engine output restriction means, and when the engine output restriction means initiates an output torque restricting operation, the lock-up inhibiting means immediately performs a lock-up inhibiting operation to release the lock-up state and to place the torque converter in a torque converting operation state. When the state of the torque converter is transitioning from the lock-up state to the torque converting operation state, a drive torque is increased to make the effect of lowering of the output torque by the engine output restriction means insufficient. Therefore, in the initial state of the acceleration slip suppressing control, it inherently takes a relatively long period to stabilize the operation. Accordingly, it takes a relatively long period for suppressing acceleration slip.

SUMMARY OF THE INVENTION

Therefore, it is an object of the present invention to solve the problems in the prior art as set forth above and to improve vehicular stability by avoiding a long period to be taken for restriction of an acceleration slip.

In a first aspect of the present invention, there is provided a slip control system for an automotive vehicle comprising:

an automatic transmission disposed in a power train from a prime mover to drive wheels;

a torque converter, provided with the automatic transmission, having a lock-up means for establishing direct and mechanical coupling between an input shaft and an output shaft;

lock-up control means for controlling operation of the lock-up means depending upon an input from a traveling state detection means which detects traveling condition including driving operation;

acceleration slip detection means provided as a part of the traveling state detection means for detecting acceleration slip of the drive wheels;

torque reduction means for reducing a torque derived from the drive wheels;

acceleration slip control means for operating the torque reduction means for performing acceleration slip suppressing control when the acceleration slip detecting means detects acceleration slip; and holding means for inhibiting switching of operational state of the lock-up means by the lock-up control means while the acceleration slip control means is in operative state for performing acceleration slip suppressing control, to maintain the torque converter in the state immediately before initiation of the acceleration slip suppressing control.

The torque reduction means may be constructed at least one of means for reducing an output torque of the prime mover and means for braking the drive wheels.

The lock-up control means may switch the lock-up means into the lock-up state when the automatic transmission is in a predetermined transmission ratio, a vehicle speed is higher than or equal to a predetermined speed, and a throttle valve open angle is less than or equal to a predetermined value.

The lock-up means may be placed in an engaged position by an apply pressure fed from a lock-up control valve via an apply circuit and in a released position by a release pressure fed via a release circuit, and the lock-up control valve is switched between an apply pressure supply state and a release pressure supply state.

The acceleration slip detection means may derive a slip ratio on the basis of a difference between a wheel speed of the drive wheel and a wheel speed of the driven wheel, and generates an acceleration slip signal when the derived slip ratio is greater than a predetermined target slip ratio.

The means for reducing the output torque of the prime mover may shut off fuel injection of a predetermined engine cylinder in a fuel injection system of the engine.

The means for reducing the output torque of the prime mover may retard a spark ignition timing in a spark ignition system of the engine.

The holding means may maintain the state of the lock-up solenoid while acceleration slip suppressing control for the lock-up solenoid is active.

In a second aspect of the present invention, there is provided a slip control system for an automotive vehicle, comprising:

a power train transmitting a drive torque developed by a prime mover to a drive wheel, the power train including an automatic power transmission with a lock-up mechanism for direct coupling of an output side of the prime mover to an input side of the automatic power transmission while a predetermined lock-up condition is satisfied;

a first sensor monitoring a first wheel speed of a drive wheel for producing a first sensor signal;

a second sensor monitoring vehicle body speed representative parameter for producing a second sensor signal;

an acceleration slip detector detecting occurrence of acceleration slip on the drive wheel on the basis of the first and second sensor signals for producing an acceleration slip detection signal;

an acceleration slip suppressing means responsive to the acceleration slip detection signal for causing deceleration of the drive wheel for maintaining wheel slippage on the drive wheel at an optimum value; and means associated with the acceleration slip suppressing means and responsive to the acceleration slip suppressing means operating for suppressing acceleration slip, for maintaining state of the lock-up mechanism immediately before initiation of the acceleration slip suppressing operation irrespective whether the lock-up condition is satisfied or not.

In the automotive slip control system as set forth above, when the acceleration slip detection means detects occurrence of acceleration slip on the drive wheels, acceleration slip suppressing control is performed, in which the torque reduction means reduces or lowers torque derived from the drive wheels for suppressing acceleration slip. Then, at this time, the holding means inhibits switching of the operation of the lock-up means by the lock-up control means. Therefore, the torque converter is maintained in the state immediately before initiation of the acceleration slip suppressing control. Accordingly, it can be successfully avoided to cause increasing of the drive torque due to switching of the state of the torque converter, which increasing of drive torque borders suppression of acceleration slip.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed in detail in terms of the preferred embodiment of the invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
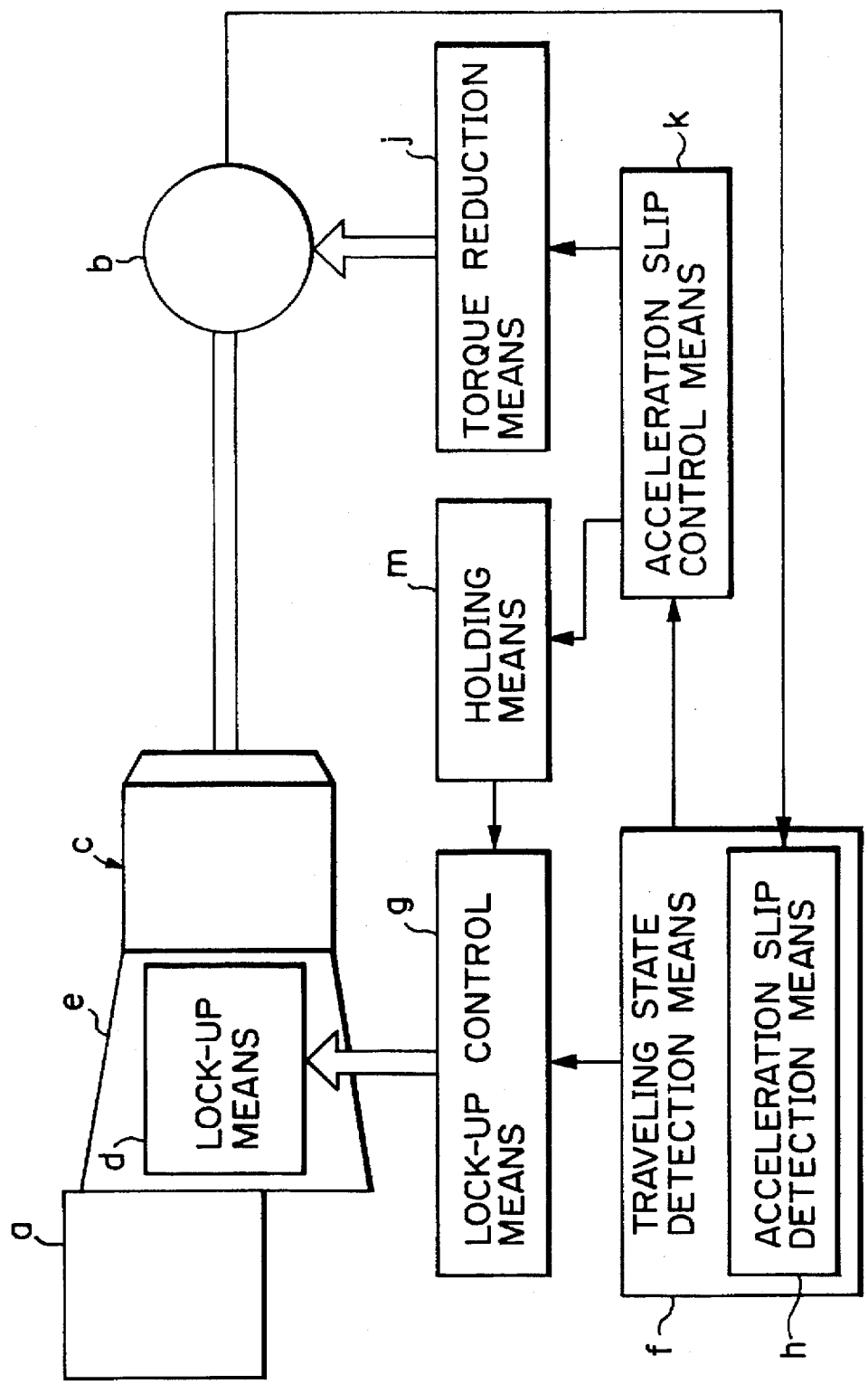
FIG. 1 is a conceptual illustration showing a slip control system for an automotive vehicle according to the present invention.

FIG. 1 is a conceptual illustration showing a slip control system for an automotive vehicle according to the present invention. As shown in FIG. 1, a slip control system for an automotive vehicle according to the present invention includes an automatic power transmission (c) disposed in a power train from a prime mover a to drive wheels (b), a torque converter (e) having a lock-up means (d) provided in the automatic power transmission (c) for establishing direct and mechanical coupling between an input shaft and an output shaft, lock-up control means (g) for controlling operation of the lock-up means (d) depending upon an input from a traveling state detection means which detects traveling condition including driving operation, acceleration slip detection means (h) provided as a part of the traveling state detection means (f) for detecting acceleration slip of the driving wheels (b), a torque reduction means (j) for reducing a torque to be delivered to the drive wheels (b), acceleration slip control means (k) for operating the torque reduction means (j) for performing acceleration slip suppressing control when the acceleration slip detecting means (h) detects acceleration slip, and holding means (m) for inhibiting switching of operational state of the lock-up means (d) by the lock-up control means (g) while the acceleration slip control means (k) is in operative state for performing acceleration slip suppressing control, to maintain the torque converter in the state immediately before initiation of the acceleration slip suppressing control.

It should be noted that the torque reduction means (j) can be constructed as at least one of means for reducing an output torque of the prime mover (a) and means for braking the drive wheels (b).

In the automotive slip control system as set forth above, when the acceleration slip detection means (h) detects an occurrence of acceleration slip on the drive wheels (b), acceleration slip suppressing control is performed, in which the torque reduction means (j) reduces or lowers torque to be delivered to the drive wheels (b) for suppressing acceleration slip. Then, at this time, the holding means (m) inhibits switching of the operation of the lock-up means (d) by the lock-up control means (g). Therefore, the torque converter (e) is maintained in the state immediately before initiation of the acceleration slip suppressing control. Accordingly, it can be successfully avoided to cause increasing of the drive torque due to switching of the state of the torque converter (e), which increasing of drive torque borders suppression of acceleration slip.

Figure 2:
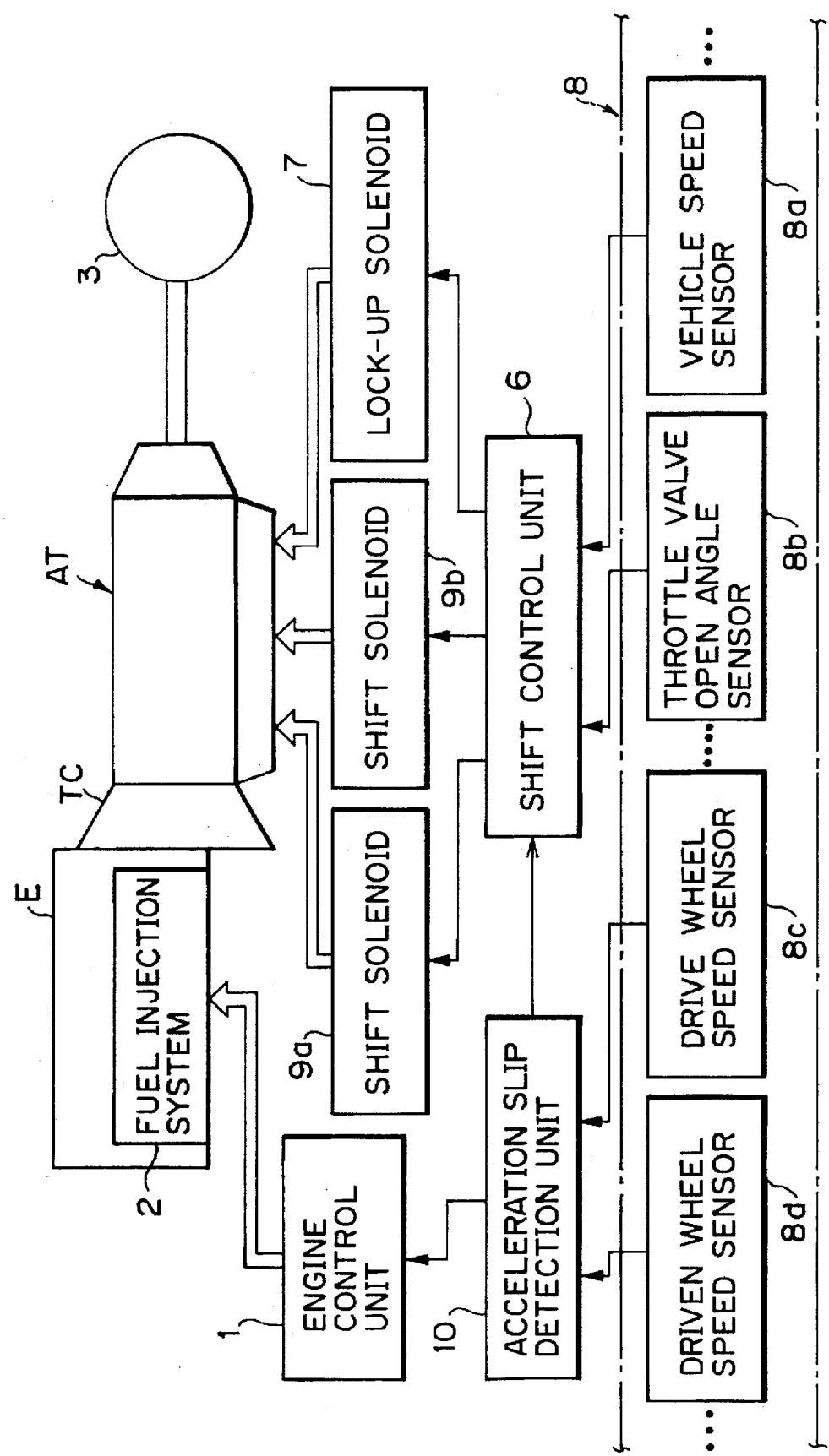
FIG. 2 is a schematic block diagram showing the preferred embodiment of the slip control system for the automotive vehicle according to the invention.

FIG. 2 is a block diagram showing an overall construction of a preferred embodiment of a slip control system for an automotive vehicle according to the present invention.

Engine (E) is controlled a fuel injection amount in a fuel injection system 2 and a spark ignition timing by an engine control unit (acceleration slip control means) 1 which is constructed by a known computer.

Figure 3:
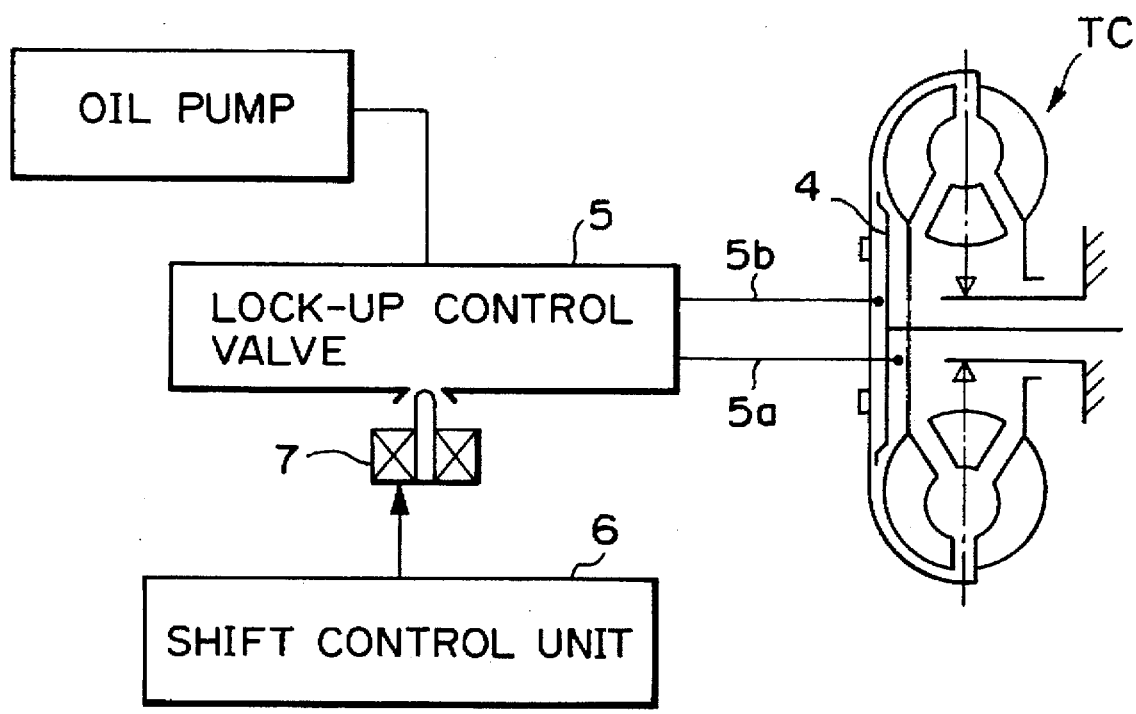
FIG. 3 is an illustration showing the major part of the preferred embodiment of the slip control system of the invention.

An output torque of the engine (E) is transmitted to a drive wheel 3 via an automatic power transmission (AT). The automatic power transmission AT is provided with a torque converter (TC). As shown in FIG. 3, the torque converter (TC) is constructed to be able to establish lock-up condition where an input side and an output side of the torque converter (TC) are directly and mechanically coupled by a lock-up piston (lock-up means) 4. The lock-up piston 4 is driven to a lock-up position by an apply pressure fed through an apply circuit 5a from a lock-up control valve 5 and is released from the lock-up position by a release pressure fed via a release circuit 5b. The lock-up control valve 5 is switched between an apply pressure supply position and a release pressure supply position by a lock-up solenoid 7 driven and controlled by a shift control unit 6.

Returning to FIG. 2, the shift control unit 6 is designed to control shifting of the automatic power transmission (AT) by combination of shift solenoids 9a and 9b according to a preliminarily set shift schedule on the basis of signals from a vehicle speed sensor 8a and a throttle open angle sensor 8b in a traveling condition detection sensor group 8 as a traveling state detection means. Also, associating with the shift control, for example, when a predetermined lock-up condition where a vehicle speed is higher than or equal to a set speed at a predetermined transmission ratio and a throttle valve open angle is less than or equal to a set throttle valve open angle, is established, for example, a lock-up control is performed by driving the lock-up solenoid 7 to shift the lock-up piston 4 to the lock-up condition (switch into the lock-up condition). The shift control unit 6 forms a lock-up control means.

Figure 4:
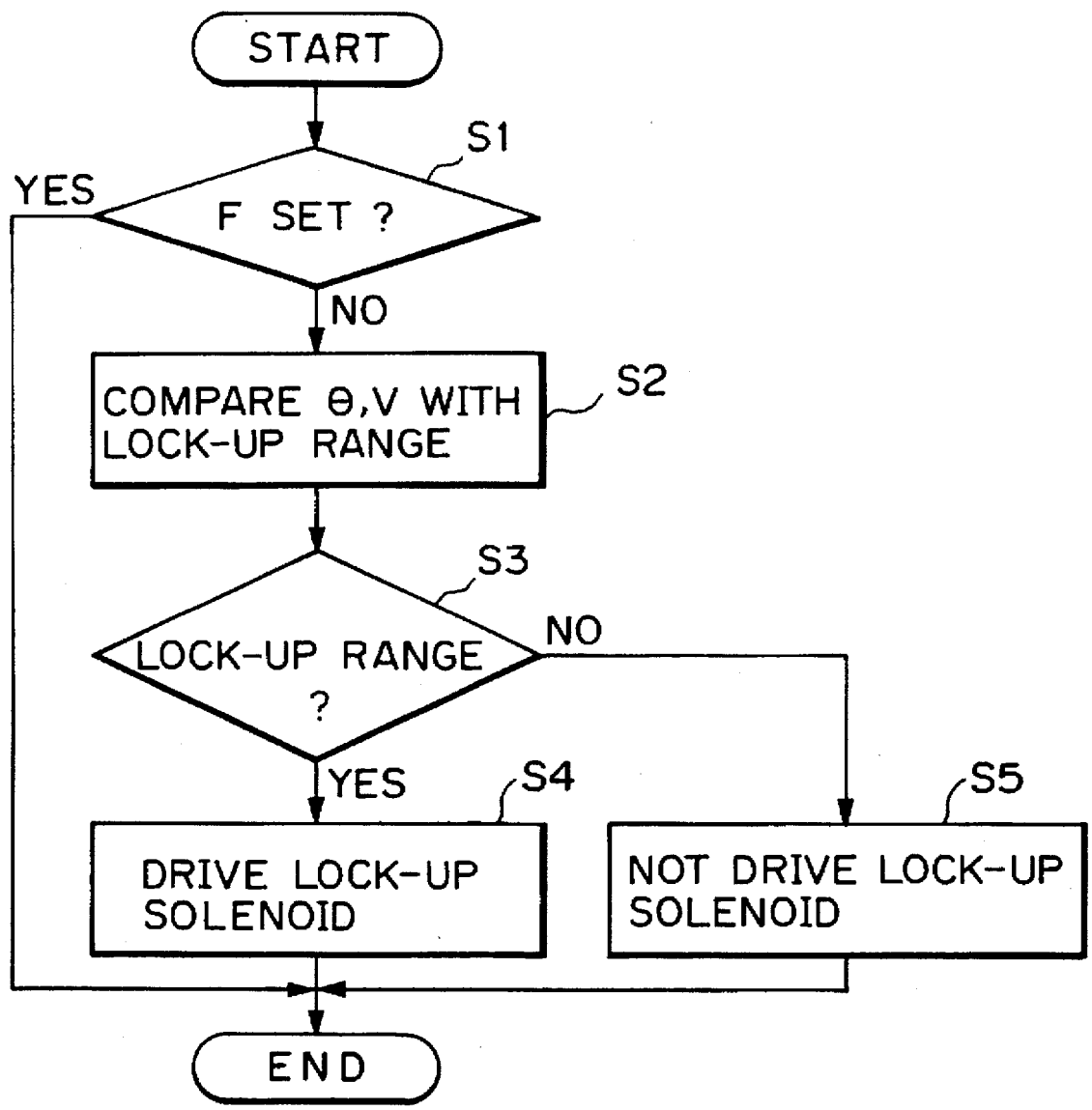
FIG. 4 is a flowchart showing a process of a lock-up control by a shift control unit of the preferred embodiment of the slip control system.

Briefly discussing a process of a lock-up control with reference to FIG. 4, at step S1, a check is performed if a torque converter control holding flag F which will be discussed later, is set or not. If YES, one cycle of lock-up control process goes to an end state. If No, the process is advanced to step S2.

At step S2, a throttle valve open angle θ and a vehicle speed V are input and compared with a lock-up region.

At step S3, a check is performed as to whether the throttle valve open angle θ and the vehicle speed V are within the lock-up region. If YES, the process is advanced to step S4. If NO, the process is advanced to step S5.

At step S4, the lock-up solenoid 7 is activated to place the torque converter (TC) in the lock-up state. At step S5, the lock-up solenoid 7 is placed in the inactivated state to place the torque converter (TC) in the torque converting state (lock-up released state). Foregoing is the process of the lock-up control in the shift control unit 6.

Returning to FIG. 2, the shown embodiment of the system, an acceleration slip detection unit 10 is provided. The acceleration slip detection unit 10 derives a slip ratio S of the drive wheel on the basis of a drive wheel speed and a driven wheel speed obtained from a drive wheel speed sensor 8c detecting wheel speed of the drive wheel 3 and a driven wheel speed sensor 8d detecting wheel speed of a not shown driven wheel. The acceleration slip detection unit 10 makes judgement that acceleration slip is caused when the slip ratio S is higher than a target slip ratio $S_0$ and then outputs an acceleration slip detection signal to an engine control unit 1. The engine control unit 1 is responsive to input of the acceleration slip detection signal to perform the acceleration slip suppressing control by shutting off fuel injection for a predetermined engine cylinder or by retarding a spark ignition timing. Accordingly, the drive wheel speed sensor 8c, the driven wheel speed sensor 8d and the acceleration slip detection unit 10 form an acceleration slip detection means. On the other hand, the engine control unit 1 corresponds to an acceleration slip control means, and the fuel injection system 2 and/or a spark ignition system form a torque reduction means.

Figure 5:
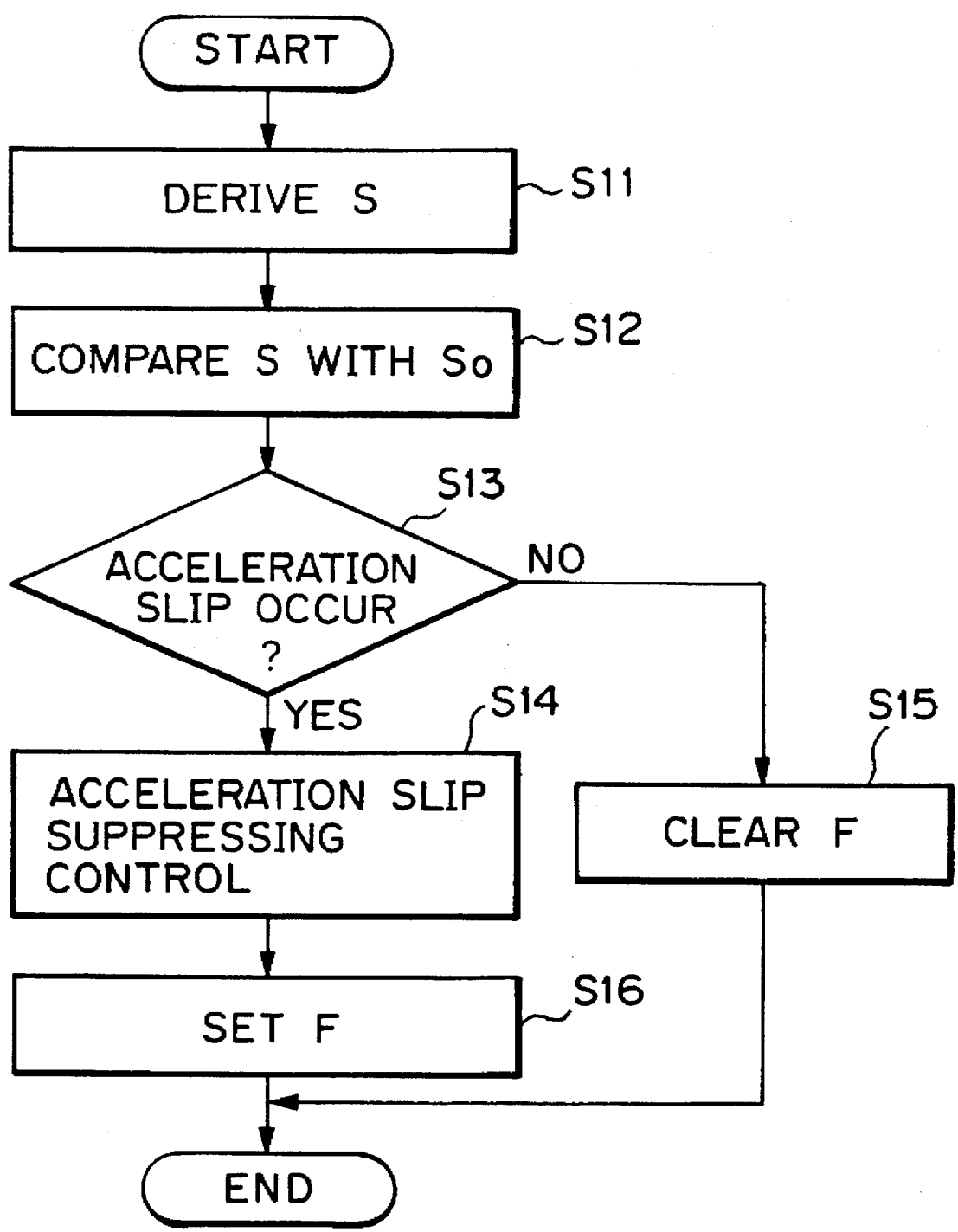
FIG. 5 is a flowchart showing a process of acceleration slip detection by an acceleration slip detecting unit and an acceleration slip suppressing control by an engine control unit in the preferred embodiment of the slip control system.

Hereinafter, acceleration slip detection and acceleration slip suppression control will be briefly discussed with reference to the flowchart of FIG. 5. At step S11, a slip ratio S is calculated based on a drive wheel speed VD and a driven wheel speed VF by the following equation.

$$S=(VD-VF)/VF$$

At step S12, the slip ratio S obtained through calculation and a target slip ratio $S_0$ as a predetermined slip ratio at which maximum traction can be obtained, are compared.

At step S13, a judgement is made as to whether acceleration slip is occurring or not depending upon whether the slip ratio S is greater than the target slip ratio $S_0$ or not. If YES, the process is advanced to step S14, and if NO, the process is advanced to step S15.

At step S14, the engine control unit 1 performs the acceleration slip suppressing control for reducing the output torque of the engine (E).

At step S15, the torque converter control holding flag F is cleared.

At step S16, the torque converter control holding flag F is set. When the torque converter control flag F is set, the process of step S2 and subsequent steps in the lock-up control of the shift control unit 6 shown in FIG. 4, will never be executed. Therefore, switching of the operating condition of the lock-up solenoid 7 is never caused. The torque converter (TC) is thus maintained in the state immediately before initiation of the acceleration slip suppressing control. Accordingly, a part of the shift control unit 6 forms a holding means.

Next, an operation of the shown embodiment of the slip control system will be discussed with reference to a timing chart of FIG. 6.

When acceleration is initiated by increasing the throttle valve open angle (at t1) and if acceleration slip is caused on the drive wheel 3, the acceleration slip is detected by the acceleration slip detection unit 10. Then, the engine control unit 1 initiates acceleration slip suppressing control for reducing the output torque of the engine (E) (at t2).

Figure 6:
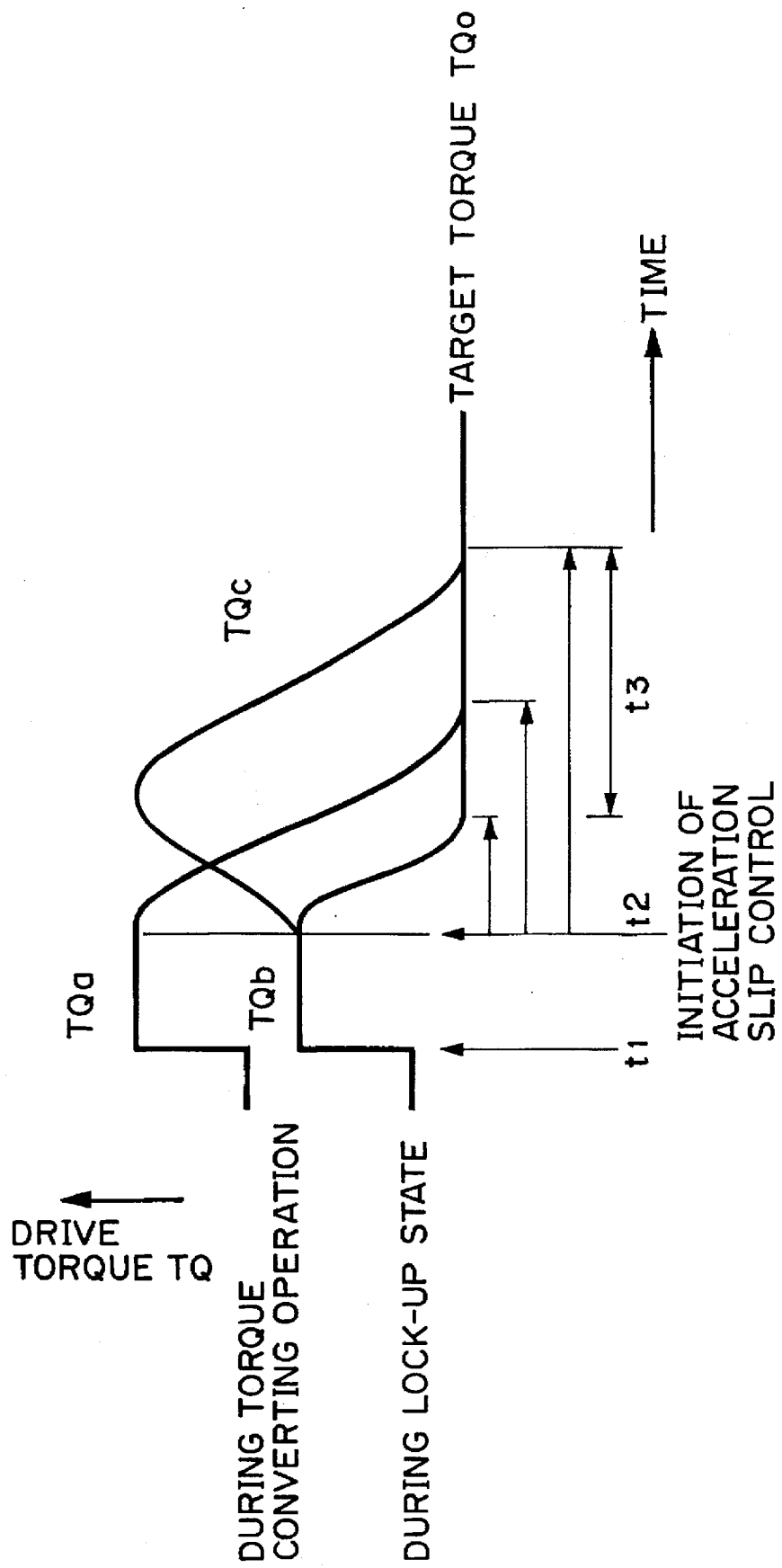
FIG. 6 is a time chart explaining an operation of the preferred embodiment according to the invention.

By this, a drive torque TQ is instantly lowered toward a target torque TQ0 irrespective of the state of the torque converter (TC) either in non-lock-up torque converting state (TQa in FIG. 6) or in lock-up state (TQb in FIG. 6). If lock-up of the torque converter is released immediately after initiation of the acceleration slip suppressing control, the drive torque TQ is once increased due to transition to the torque concerting operation state as shown by TQc in FIG. 6, and subsequently lowered by the effect of the acceleration slip suppressing control. Therefore, in comparison with the case where the acceleration slip suppressing control is performed with holding the lock-up state, a timing to lower the drive torque TQ to the target torque TQ0 is delayed by t3.

As set forth above, with the shown embodiment of the slip control system for the automotive vehicle, since switching of lock-up state of the torque converter (TC) is inhibited to maintain the instantaneous position while the acceleration slip suppressing control is in operation, it is never caused to increase of the drive torque TQ which is caused by release of lock-up during acceleration slip suppressing control. Therefore, in lowering of the drive torque TQ to the target torque TQ0, substantially no delay is caused to permit quick and stable acceleration slip suppression which can thereby be achieved.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For example, while the shown embodiment has been discussed for the case where the output torque of the engine (E) is lowered as the acceleration slip suppressing control, it is only required to lower the torque to be delivered to the drive wheel 3 and thus, the equal effect may be obtained by applying brake to the drive wheel 3. Alternatively, it is also possible to use braking of the drive wheel in combination with lowering of the output torque of the engine (E).

What is claimed is:

1. A slip control system for an automotive vehicle comprising:
    an automatic transmission disposed in a power train from a prime mover to drive wheels;
    a torque converter, provided with the automatic transmission, having a lock-up means for establishing direct and mechanical coupling between an input shaft and an output shaft;
    lock-up control means for controlling operation of said lock-up means depending upon an input from a traveling state detection means which detects a traveling condition including a driving operation;
    acceleration slip detection means provided as a part of said traveling state detection means for detecting an acceleration slip of the drive wheels;
    torque reduction means for reducing a torque derived from said drive wheels;
    acceleration slip control means for operating said torque reduction means for performing acceleration slip suppressing control when said acceleration slip detecting means detects acceleration slip; and
    holding means for inhibiting switching of an operational state of said lock-up means by said lock-up control means while said acceleration slip control means is in an operative state for performing acceleration slip suppressing control, when the torque converter is in a lock-up state immediately before initiation of the acceleration slip suppressing control, to maintain the lock-up state of the torque converter.

2. A slip control system as set forth in claim 1, wherein said torque reduction means is constructed as at least one of means for reducing an output torque of the prime mover and means for braking the drive wheels.

3. A slip control system as set forth in claim 2, wherein said means for reducing the output torque of said prime mover shuts off fuel injection of a predetermined engine cylinder in a fuel injection system of the engine.

4. A slip control system as set forth in claim 2, wherein said means for reducing the output torque of said prime mover retards a spark ignition timing in a spark ignition system of the engine.

5. A slip control system as set forth in claim 1, wherein said lock-up control means switches said lock-up means into the lock-up state when the automatic transmission is in a predetermined transmission ratio, a vehicle speed is higher than or equal to a predetermined speed, and a throttle valve open angle is less than or equal to a predetermined value.

6. A slip control system as set forth in claim 5, wherein said lock-up means is placed in an engaged position by an apply pressure fed from a lock-up control valve via an apply circuit and in a released position by a release pressure fed via a release circuit, and said lock-up control valve is switched by a lock-up solenoid between an apply pressure supply state and a release pressure supply state.

7. A slip control system as set forth in claim 6, wherein said holding means maintains the state of said lock-up solenoid while acceleration slip suppressing control for said lock-up solenoid is active.

8. A slip control system as set forth in claim 1, wherein said acceleration slip detection means derives a slip ratio on the basis of a difference between a wheel speed of said drive wheel and a wheel speed of said driven wheel, and generates an acceleration slip signal when the derived slip ratio is greater than a predetermined target slip ratio.

9. A slip control system for an automotive vehicle, comprising:
    a power train transmitting a drive torque developed by a prime mover to a drive wheel, said power train including an automatic power transmission with a lock-up mechanism for direct coupling of an output side of said prime mover to an input side of said automatic power transmission while a predetermined lock-up condition is satisfied;
    a first sensor monitoring a first wheel speed of a drive wheel for producing a first sensor signal;
    a second sensor monitoring a vehicle body speed representative parameter for producing a second sensor signal;
    an acceleration slip detector detecting an occurrence of acceleration slip on said drive wheel on the basis of said first and second sensor signals for producing an acceleration slip detection signal;
    an acceleration slip suppressing means responsive to said acceleration slip detection signal for causing deceleration of said drive wheel for maintaining wheel slippage on said drive wheel at an optimum value; and
    means, associated with said acceleration slip suppressing means and responsive to said acceleration slip suppressing means operating for suppressing acceleration slip, for maintaining said lock-up mechanism in a lock-up state when said lock-up mechanism is in the lock-up state immediately before initiation of the acceleration slip suppressing operation, irrespective of whether said predetermined lock-up condition is satisfied or not.

10. A slip control method for an automotive vehicle, said automotive vehicle including a power train transmitting a drive torque developed by a prime mover to a drive wheel, said power train including an automatic power transmission with a lock-up mechanism for direct coupling of an output side of said prime mover to an input side of said automatic power transmission while a lock-up condition is satisfied, the method comprising the steps of:
    a) monitoring a first wheel speed of a drive wheel for producing a first sensor signal;
    b) monitoring a vehicle speed for producing a second sensor signal;
    c) detecting an occurrence of acceleration slip on said drive wheel on the basis of said first and second sensor signals for producing an acceleration slip detection signal;
    d) providing slip control by causing deceleration of said drive wheel when said acceleration slip detection signal is produced;
    e) maintaining said lock-up mechanism in a state in which said lock-up mechanism was in immediately before initiation of the step d),
    wherein the maintaining step e) is performed throughout a period when the slip control is provided in the step d).

11. A slip control method as set forth in claim 10, wherein the state in which said lock-up mechanism was in immediately before initiation of the step d) is one of a lock state and an unlock state.

* * * * *